United States Patent
Gao et al.

(10) Patent No.: US 8,447,935 B2
(45) Date of Patent: May 21, 2013

(54) METHOD AND APPARATUS FOR FACILITATING COMMUNICATION BETWEEN VIRTUAL MACHINES

(75) Inventors: Zhi Guo Gao, Beijing (CN); Li Li, Beijing (CN); Rui Xiong Tian, Beijing (CN); Qi Ming Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 12/711,775

(22) Filed: Feb. 24, 2010

(65) Prior Publication Data

US 2010/0217916 A1 Aug. 26, 2010

(30) Foreign Application Priority Data

Feb. 26, 2009 (CN) .......................... 2009 1 0118521

(51) Int. Cl.
*G06F 12/02* (2006.01)
*G06F 12/08* (2006.01)

(52) U.S. Cl.
USPC ........ 711/147; 711/6; 711/170; 711/E12.002; 711/E12.007; 718/1

(58) Field of Classification Search
USPC ............... 711/147, 6, 170, E12.002, E12.007
See application file for complete search history.

(56) References Cited

U.S. PATENT DOCUMENTS

| 7,346,909 B1 | 3/2008 | Eldar et al. | |
| 2005/0102671 A1 | 5/2005 | Baumberger | |
| 2005/0114855 A1* | 5/2005 | Baumberger | 718/1 |
| 2007/0288921 A1 | 12/2007 | King et al. | |
| 2008/0086729 A1* | 4/2008 | Kondoh et al. | 718/1 |

FOREIGN PATENT DOCUMENTS

CN 1831790 A 9/2006

OTHER PUBLICATIONS

Chanda, et al., Virtual Machine Communication Interface—An Inter-VM Communication Mechanism, VMWorld 2007, pp. 1-30.
VMWare, Virtual Machine Communication Interface, http://www.vmware.com/support/developer/vmci-sdk (accessed Dec. 16, 2008).
Griffin, et al., Presentation slides of Xen Loop, ACM Middleware, Nov. 28, 2007, pp. 1-22.

* cited by examiner

*Primary Examiner* — Yong Choe
(74) *Attorney, Agent, or Firm* — Scully, Scott, Murphy & Presser, P.C.; Eustus D. Nelson, Esq.

(57) ABSTRACT

A computer-implemented method, apparatus, and virtual machine for facilitating the communication between VMs. The method of facilitating the communication between a first VM and a second VM includes: allocating a shared memory segment from within the memory of the physical machine; mapping the requested memory space addresses to the shared memory segments in response to the memory space requests from the VMs; and providing the requested memory space addresses. A method of communication from a first VM to a second VM includes: requesting a memory space in response to a notification that a shared memory segment has been allocated; obtaining the requested memory space address, which has been mapped to the allocated shared memory segment; and accessing communication data in the shared memory segment according to the address. The apparatus and virtual machine executes the steps of the methods.

9 Claims, 5 Drawing Sheets

METHOD AND APPARATUS FOR FACILITATING COMMUNICATION BETWEEN VIRTUAL MACHINES

CROSS-REFERENCE TO RELATED APPLICATIONS

This application claims priority under 35 U.S.C. §119 to Chinese Patent Application No. 200910118521.6 filed Feb. 26, 2009, the entire contents of which are incorporated by reference herein.

BACKGROUND OF THE INVENTION

1. Field of the Invention

This invention relates to a method and apparatus for facilitating communication between virtual machines (VMs), and more particularly, this invention relates to a method and apparatus for facilitating communication between VMs hosted in the same physical machine.

2. Description of the Related Art

Virtualization and multi-core techniques are being widely used in information technology. Virtualization techniques can isolate VMs (virtual machines) from the detail of their underlying host hardware platform, and therefore can detect migration, separation and integration of VMs. On this basis, virtualization techniques can utilize system resources efficiently and reduce the total cost of basic computer architecture. More specifically, virtualization technique can reduce the total cost of hardware platform and software management, as well as reduce the operation cost, while at the same time, enhance system availability, improve system scalability, and increase system reliability and system flexibility by ensuring resources for the key applications.

On the other hand, the development of multi-core techniques enable processors to extend from the original single core to dual-, quad-, eight-core chips, to the latest chips with tens or even hundreds of cores. The heterogeneous multi-core approach alters the multi-core architecture from traditional homogeneous design to heterogeneous design of "master core+slave processors", which provides excellent performance especially for processing multimedia, recognition and networking applications. The processor performance has been improved greatly along with the development of multi-core techniques.

Figure 1:
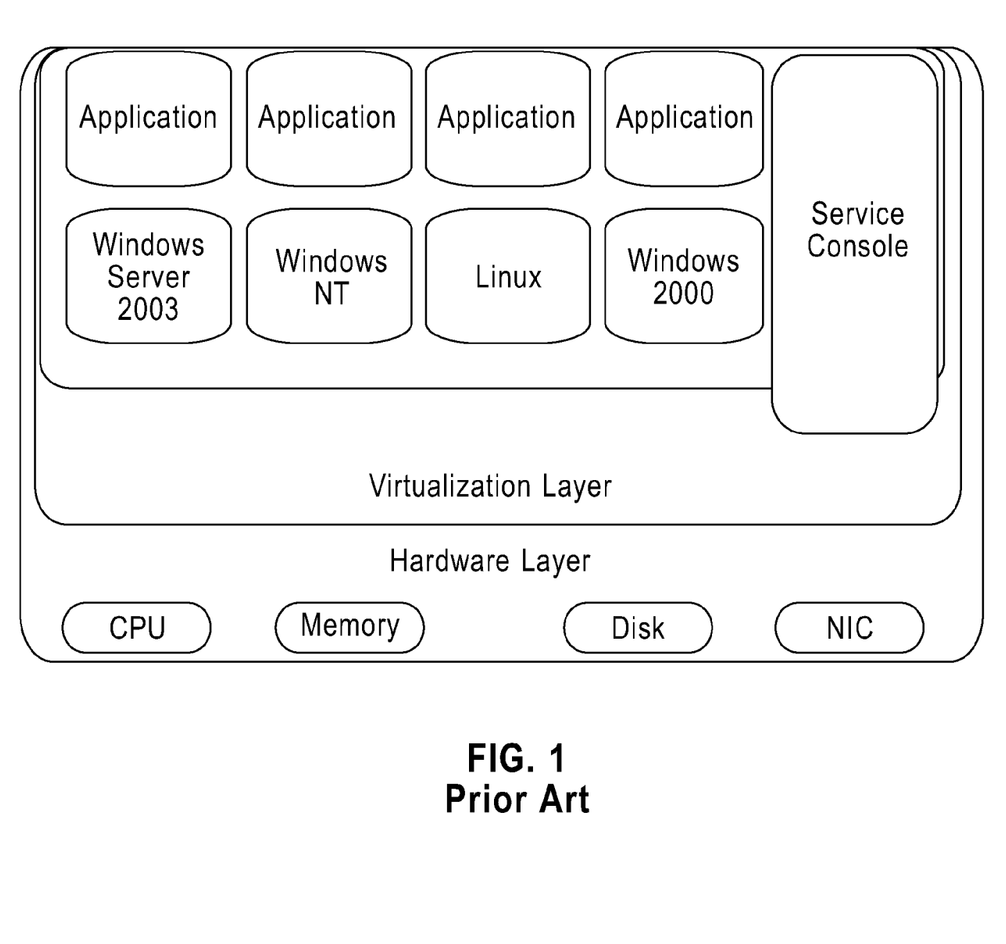
FIG. 1 is a graphical illustration of a plurality of VMs in the same physical machine.

To better utilize processor resources and resource integration, a physical machine with strong processing ability can usually host a plurality of VMs. FIG. 1 illustrates a plurality of VMs in one physical machine. As shown in the figure, four VMs are hosted in the same physical machine. These four VMs have their own operating system and applications installed, and execute their own processing just like four actual computers. Through a virtualization layer between VMs' operating system and the hardware platform, multiple VMs can share the actual hardware resources of the physical machine, such as CPU, memory, NIC, etc. Like actual computers, communication and data transfer are necessary between these VMs to execute target jobs. In the following, the communication process between VMs in the existing technology will be explained, taking a popular open-source virtualization product Xen (http://www.xen.org/) as an example.

Figure 2:
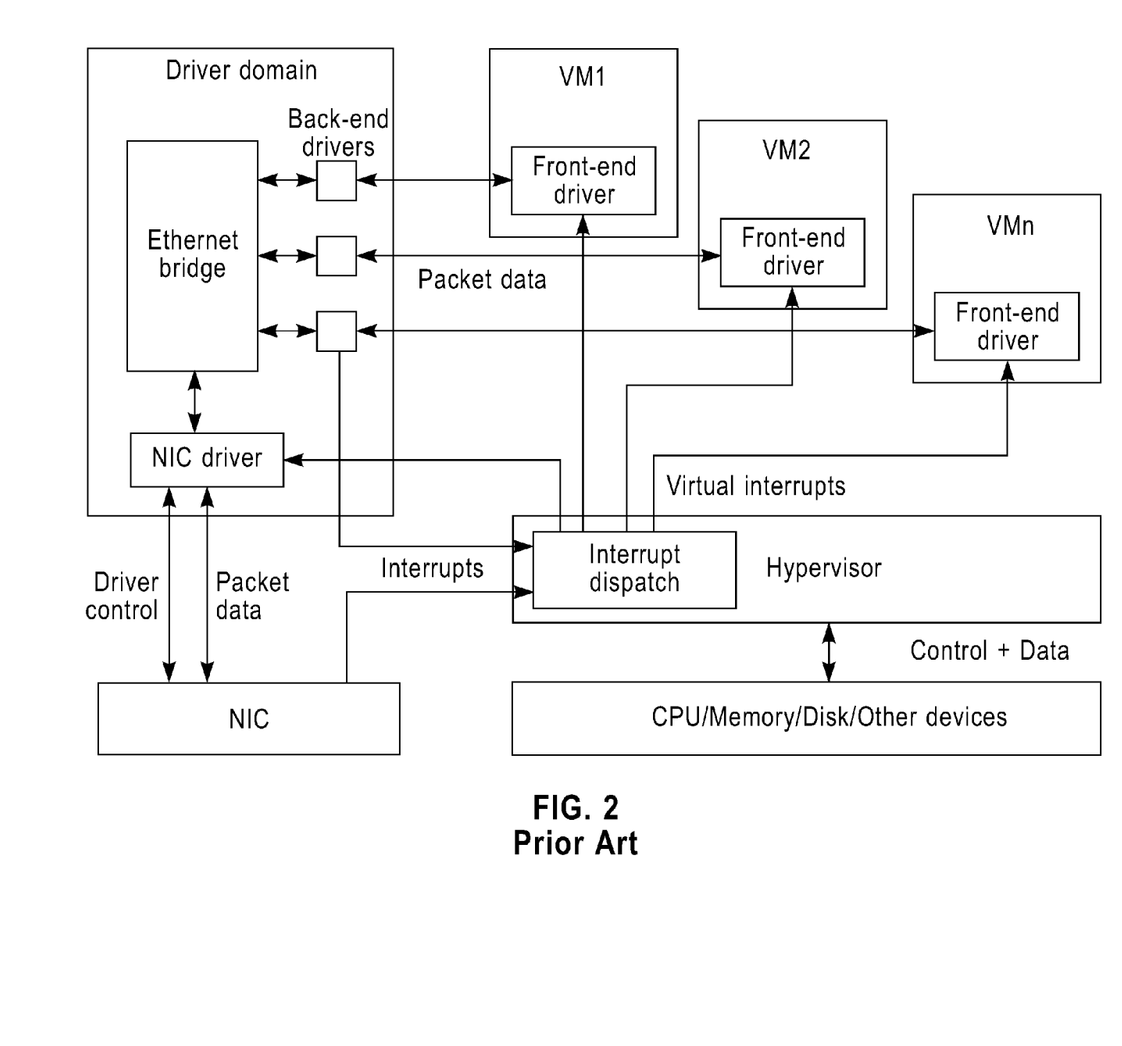
FIG. 2 is a block diagram of Xen's network virtualization system.

FIG. 2 is a block diagram of the Xen network virtualization system. As shown in FIG. 2, besides a plurality of VMs 1-n, Xen network system also contains two key components, the Xen hypervisor and the driver domain. Xen hypervisor is located below the guest operating systems of all VMs and above the hardware. It abstracts the underlying physical hardware, takes charge of CPU scheduling and memory allocation for each VM, and controls the shared runtime environment, enabling each VM to run as if it were running natively on the hardware. To detect external connection and communication, the VMs must share the I/O devices in the hardware platform. These shared I/O devices are controlled by a special I/O domain, called driver domain in Xen. Specifically, the driver domain runs a modified version of Linux that uses native Linux device drivers to manage physical I/O devices. VMs can communicate with physical I/O via the driver domain.

To communicate with the driver domain and the physical I/O devices, each VM is given a virtual I/O device, which is controlled by a special device driver, called the front-end driver. Accordingly, there is a plurality of back-end drivers in the driver domain that communicates with the corresponding front-end driver. The back-end drivers are connected to the physical NIC (network interface card) by an Ethernet bridge within the driver domain. The following is a detailed description of the steps of transmitting and receiving data packet by a VM in Xen system.

When a VM transmits a packet, the packet is first copied from the front-end driver in the VM to the back-end driver in the driver domain. Then, in the driver domain, the packet is routed through the Ethernet bridge to the physical NIC's device driver. The packet is then packed and queued by the physical NIC's device driver for transmission on the network interface as if it were generated normally by the operating system within the driver domain.

When a VM receives a packet, the physical NIC first generates an interrupt, which is captured by the interrupt dispatch unit in the hypervisor and routed to the NIC's device driver in the driver domain as a virtual interrupt. Then the NIC's device driver transfers the packet to the Ethernet bridge, which routes the packet to the appropriate back-end driver. The back-end driver then copies the packet to the front-end driver in the target VM. Once the packet is transferred to the target VM, the back-end driver requests the hypervisor to send an additional virtual interrupt to the target VM notifying it of the new packet. Upon receiving the virtual interrupt, the front-end driver of the VM delivers the packet to the VM's network stack as if it had come directly from a physical device.

Another popular virtualization product VMWare (http://www.vmware.com/) also adopts a similar VM communication approach, transmitting and receiving packets alike. Moreover, VMWare introduces a virtual Ethernet switch between VMs and the physical adapter to facilitate networking.

Through the above-described packet transmitting and receiving approach, a VM can detect communication with other VMs. The physical host of the target VM is not differentiated in the above approach, i.e., the communication between any two VMs needs to go top-down from one VM's front-end driver via the back-end driver to the physical NIC, and then come bottom-up from the physical NIC via the hypervisor and the driver domain to the other VM. In such a process, a packet is copied at least twice between VMs and the physical machine and is also packed in transmitting and unpacked in receiving. Because of these unnecessary operations, this approach is not efficient, especially for VMs in the same physical machine. For VMs in the same physical machine, the communication between VMs only involves data transfer within the physical machine, not necessarily via the NIC. Therefore, the existing communication technique needs to be improved—that is, an improvement to the communication method between VMs, especially between VMs in the same physical machine, is needed to increase the communication efficiency by avoiding unnecessary operations and optimizing system resources.

SUMMARY OF THE INVENTION

Based on the above considerations, the present invention provides a computer-implemented method and apparatus for facilitating communication between VMs.

According to one embodiment of the present invention, a computer-implemented method is provided for facilitating the communication between a first VM and a second VM, where the first VM and said second VM are in the same physical machine. The method includes: allocating a shared memory segment from within the memory of the physical machine and notifying the first VM and the second VM of the allocation; mapping the address of a memory space requested by the first VM to a first address of the shared memory segment and mapping the address of a memory space requested by the second VM to a second address of the shared memory segment; and providing the address of the requested memory space by the first VM to the first VM and the address of the requested memory space by the second VM to the second VM.

According to another embodiment of the present invention, a computer-implemented method of communication from a first VM to a second VM is provided, where the first VM and said second VM are in the same physical machine. The method includes: requesting a memory space in response to a notification that a shared memory segment within the physical machine has been allocated; obtaining the address of the requested memory space, where the address of the requested memory space has been mapped to the address of the allocated shared memory segment; and accessing communication data in the shared memory segment according to the obtained address of the requested memory space.

According to still another embodiment of the present invention, a computer-implemented communication management apparatus for facilitating the communication between a first VM and a second VM is provided, where the first VM and said second VM are in the same physical machine. The apparatus includes: a memory allocation unit configured to allocate a shared memory segment from within the memory of the physical machine and notify the first VM and the second VM of the allocation; and a memory mapping unit configured to map the address of a memory space requested by the first VM to a first address of the shared memory segment, map the address of a memory space requested by the second VM to a second address of the shared memory segment, and provide the address of the requested memory space by the first VM to the first VM and the address of the requested memory space by the second VM to the second VM.

According to yet another embodiment of the present invention, a computer-implemented VM is provided for communicating with another VM in the same physical machine, where the VM includes: a network connecting unit configured to: request a memory space in response to a notification that a shared memory segment has been allocated; obtain the address of the requested memory space that has been mapped to the address of the allocated shared memory segment; and access communication data in the shared memory segment according to the obtained address of the memory space.

DETAIL DESCRIPTION OF PREFERRED EMBODIMENTS

For VMs in the same physical machine, this invention provides a method and apparatus for facilitating communication between VMs. Following is the description of the embodiments in connection with the drawings.

Figure 3:
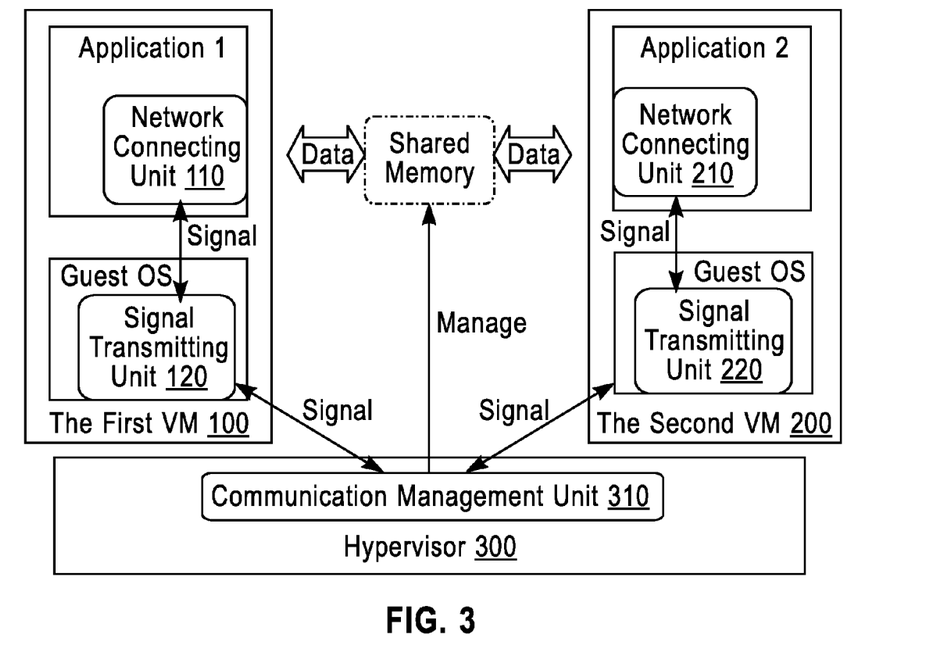
FIG. 3 is a block diagram of a virtual machine communication system according to one embodiment of the present invention.

Referring to FIG. 3, a block diagram illustrates a virtual machine communication system according to one embodiment of the present invention. In FIG. 3, there are two VMs involved in the communication, the first VM 100 and the second VM 200, that are located in the same physical machine. In each VM, a guest operating system installed to run various applications. To achieve high-speed communication, a network connecting unit and a signal transmitting unit is provided in each VM, where the network connecting unit is implemented by a relative networking library that can be called on by the applications. The function and implementation of this unit will be described in detail later. A hypervisor layer 300 is provided between the VMs and the physical machine's hardware layer. The hypervisor layer 300 can directly communicate with each VM, deploying and managing them. The hypervisor layer 300 includes a communication management unit 310, configured to communicate between the first VM 100 and the second VM 200. Details of the process implemented by the above-mentioned VMs and the communication management unit for achieving high-speed communication are described below.

Figure 4:
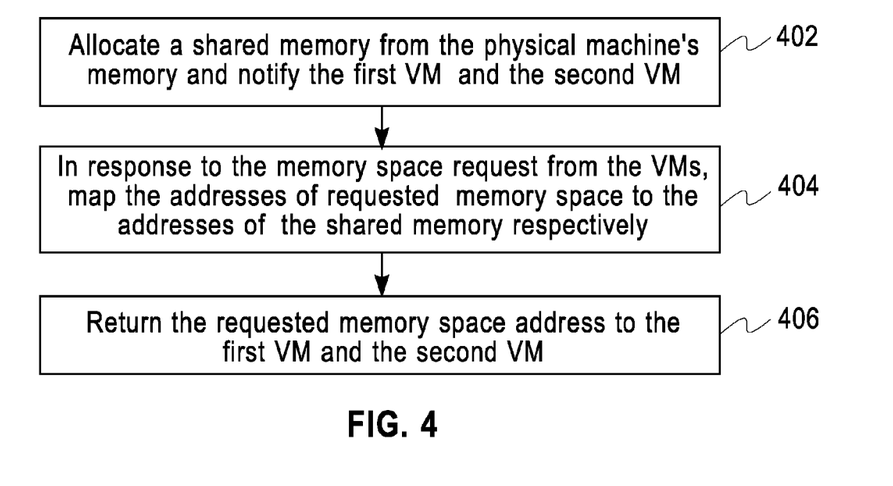
FIG. 4 is a flowchart of the method for facilitating communication between two VMs according to one embodiment of the present invention.

Referring to FIG. 4, a flowchart shows the method for facilitating communication between two VMs according to another embodiment of the invention. The steps in the method are executed by the communication management unit 310 of FIG. 3 to facilitate the communication between the first VM and the second VM that are in the same physical machine. As shown in FIG. 4, the steps include: first allocating a shared memory segment from the physical machine's memory and notifying the first VM and the second VM at step 402; then, in response to the memory space request from the first VM and the second VM, mapping the addresses of the requested memory space respectively to the addresses of the shared memory at step 404; and returning the addresses of the requested memory space to the first VM and the second VM at step 406.

In the embodiment of the present invention, the communication management unit 310 first determines whether the first VM and the second VM are in the same physical machine before executing step 402. If not, the communication continues in the traditional manner; if yes, steps 402-406 in FIG. 4 will be executed. After step 406 is executed, the first VM and the second VM can transfer data via the shared memory.

In the embodiment of the present invention, the first VM and the second VM start to transfer data after step 406. During the data transferring, the communication management unit 310 can notify the second VM of the specific address of the data copied by the first VM in the shared memory, such that the second VM can read the data from the shared memory according to the address. Specifically, in the embodiment of the present invention, the specific address of the copied data in the shared memory contains the start address of the shared memory and the offset from the start address. In this case, the communication management unit 310 can get the offset of the data copied by the first VM and notify the second VM of the offset, thereby enabling the second VM to find the corresponding memory address according to the offset.

In the embodiment of the present invention, the communication management unit 310 further frees the shared memory after the communication between the first VM and the second VM is finished.

Figure 5:
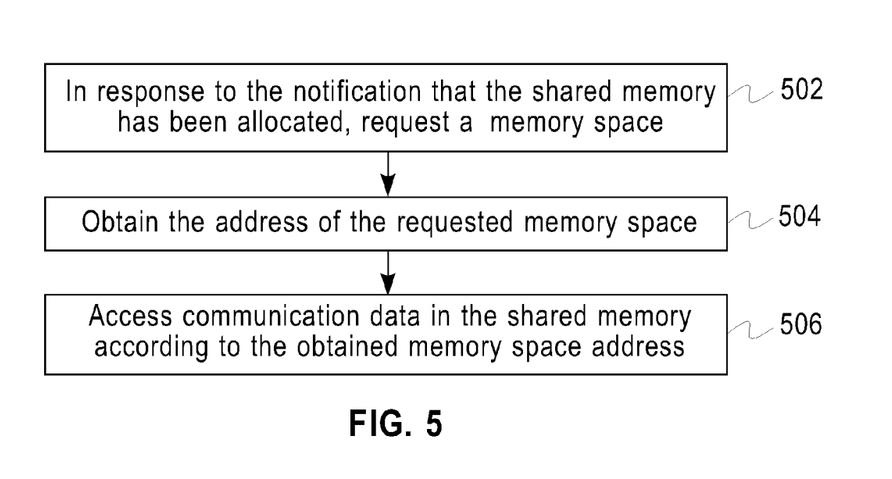
FIG. 5 is a flowchart of the method for communicating with another VM according to one embodiment of the present invention.

Corresponding to FIG. 4, FIG. 5 shows a flowchart of the method for communicating with another VM according to one embodiment of the invention. All steps in the method are executed by the first VM or the second VM of FIG. 3, where the first VM and the second VM are in the same physical machine. As shown in FIG. 5, the steps include: at step 502, requesting a memory space in response to the notification that the shared memory has been allocated; at step 504, obtaining the address of the requested memory space that has been mapped to the address of the shared memory; and at step 506, accessing communication data in the shared memory according to the obtained address of the memory space.

In the embodiment of the present invention, VM 100 or 200 first connects to another VM before step 502.

By executing the above steps, VM 100 or 200 directly communicates with the communication management unit 310, allowing VM 100 or 200 to obtain the information of its allocated shared memory, so as to detect a data transfer between the VMs using the shared memory in the same physical machine. To execute the above steps 502-506, network connecting units 110 and 210 are provided in VM 100 and 200 respectively. In the embodiment of the present invention, network connecting units 110 and 210 can be implemented by a library with a plurality of functions related to the connection, which can be called by various applications installed in the VMs—i.e., to execute the steps in FIG. 5, the network connecting units can be implemented by modifying or extending the existing libraries without changing the current applications. However, because the network connecting units, implemented in this way, lies on the VMs' application layer, the network connecting units cannot communicate directly with the communication management unit 310. Thus, signal transmitting units 120 and 220 are provided in the respective operating system layer of the VMs to transmit communication signals between the network connecting units and the communication management unit 310. Thereby, network connecting units 110 and 210 can interact with the communication management unit 310 via the corresponding signal transmitting units 120 and 220 to execute the steps in FIG. 5 and thus to detect the communication between VM 100 and 200.

In the following, the steps executed by the communication management unit 310 and the steps executed by the VMs are described in detail in connection with specific examples.

In one example, a first application installed in the first VM communicates with a second application in the second VM to exchange data. Moreover, in this example, the communication between the first VM and the second VM is a connection-oriented communication, for example using TCP protocol. In this communication manner, the communication process can be divided into three phases: a connection setting up phase, a data transfer phase, and a connection closing phase.

The connection setting up is a phase specific to the connection-oriented communication. In this phase, the first application initiating the communication first notifies the second application of the transferring, and starts to transfer a valid data packet after getting the response from the second application to ensure the reliability and sequence of the data transfer. During the above process, the first application connects to the second application by calling and loading the existing library in the system. However, as mentioned above, by modifying of the existing libraries, the calling step involves calling the network connecting unit 110 directly—i.e., without changing the application, the first application connects to the second application transparently via the network connecting unit 110. At the same time, the network connecting unit 110 communicates with the communication management unit 310 via the corresponding signal transmitting unit 120, notifying it of the connection between the first VM and the second VM. Since the notification of data transferring from the first application to the second application contains at least the identifier, for example the IP address, of the second VM hosting the second application, the communication management unit 310 can get the address information of the target VM by communicating with the network connecting unit 110. With such address information, the communication management unit 310 can determine whether the second VM as the target VM is in the same physical machine with the first VM. If they are not in the same physical machine, the communication management unit 310 notifies the first VM to communicate in the traditional way. If the address of target VM shows that the two VMs are in the same physical machine, the communication management unit 310 provides a shared memory segment to facilitate the communication between the first VM and the second VM.

For a connection-oriented communication, in response to the transfer request from the first application in the first VM to the second application in the second VM, the communication management unit 310 allocates a new segment of shared memory in the memory space of the physical machine hosting the two VMs. The size of the shared memory depends on factors like the available memory resource of the physical machine, the communication type between the VMs, etc. After allocating the shared memory, the communication management unit 310 notifies the network connecting units 110 and 210 of the prepared shared memory and its size respectively via signal transmitting units 120 and 220.

After determining that the shared memory is ready, network connecting units 110 and 210 request the memory space needed for communication from the communication management unit 310 via signal transmitting units 120 and 220. Responding to the request, the communication management unit 310 maps the addresses of the requested memory space to the addresses of the allocated shared memory, and returns the addresses of the requested memory space to the network connecting units 110 and 210, thereby allowing the network connecting units 110 and 210 to obtain the requested memory space addresses that have been mapped to the shared memory addresses by the communication management unit 310. Here, the memory preparation is ready for the communication and then the communication goes into the data transfer phase.

In the data transfer phase, the first application that initiates the communication transfers data to the second application in the second VM via the network connecting unit 110 in the first VM 100. Specifically, according to the obtained memory space address, the network connecting unit 110 copies the data to be transferred into the memory space. However, because the memory space address has already been mapped to the shared memory address allocated by the communication management unit 310, the network connecting unit 110 copies the data into the shared memory. After copying the data, the network connecting unit 110 notifies the signal transmitting unit 120, then the signal transmitting unit 120 notifies the communication management unit 310, and thus the communication management unit 310 notifies the network connecting unit 210 of the data copying via the signal transmitting unit 220. Finally, the network connecting unit 210 notifies the second application of the new data and reads the newly received data from the shared memory according to the obtained address returned from the communication management unit 310. Thus, the first application in the first VM and the second application in the second VM can detect communication and data transfer by utilizing the shared memory in the same physical machine.

In one example in the embodiment of the present invention, when copying data into the shared memory, the network connecting unit 110 in the first VM notifies the communication management unit 310 of the specific address of the copied data—i.e., the offset from the start address of the shared memory such that the second application could read the data from the shared memory according to the specific address. In another example in the embodiment of the present invention, when copying data into the shared memory, the network connecting unit 110 flags the newly copied data. The flag can indicate whether the data has been read and whether the memory used by the data can be rewritten. For instance, a counter is set for each cell of the shared memory. The counter status can be 0 or 1 for example, where 0 indicates the corresponding memory cell that can be rewritten presently while 1 indicates the corresponding memory cell has new data to be read. Each accessing operation on a memory cell will trigger the corresponding counter status to change. In this way, one side in the communication can write data into the memory cells with status 0 in the shared memory and then the status of the corresponding counter becomes 1. The other side in the communication can read data from the memory cells with status 1 and the reading operation resets the counter status to 0. In such a manner, the first VM and the second VM can detect an exchange and transmission of data by accessing data in the shared memory.

Because two VMs use the same one shared memory space and access data in the memory at the same time, there can be an isolation problem between the VMs i.e., the problem of how to avoid conflicts in the memory operation. This problem is very similar to the isolation problem between multiple processes in operating systems. In case of processes, two processes can share one memory space by using, for example, the system calling function mmap( ) in Unix/Linux. The memory space is mapped to two processes at the same time, allowing them to read/write data. To isolate these two processes, a plurality of mechanisms is provided in the operating systems to solve this problem, for example, the mutex/lock and allocate/free methods. In the virtual communication system shown in FIG. 3, the hypervisor functions like an operating system and the plurality of VMs on the upper layer are similar to the plurality of processes in the operating system. Thus, the method for isolating multiple processes can be used to isolate multiple VMs by the communication management unit 310 in the hypervisor layer. It is understood that those skilled in this art can utilize a proper existing method to isolate multiple VMs sharing one memory space according to the communication characteristic.

Through the above data transfer phase, the first application in the first VM and the second application in the second VM can complete data exchange and transmission. Then, the communication goes into the connection closing phase. In this phase, the first application disconnects with the second application via the network connecting unit 110. Specifically, the network connecting unit 110 communicates with the communication management unit 310 via the signal transmitting unit 120, notifying it of the closing of the communication. Responding to this notification, the communication management unit 310 can free the shared memory allocated in the connection setting up phase and notifies the network connecting unit 210 via the signal transmitting unit 220 in the second VM.

In the whole communication process described above, the communication management unit 310 allocates a shared memory for the two VMs in the connection setting up phase and maps the requested space addresses to the addresses of the shared memory, so that the VMs can detect data exchange via the shared memory in data transfer phase. Therefore, in the above example, the allocation and the mapping of the shared memory is essential for efficient communication. The shared memory allocating process and the address mapping process will be described in further detail below.

First, the memory management manner in virtual machine systems will be described. In a virtual machine system, a plurality of VMs, such as the first VM 100 and the second VM 200 shown in FIG. 3, can be installed in a hardware platform. All installed VMs are deployed and managed by the underlying hypervisor. Because the first VM and the second VM need to share the memory of the hardware platform, the hypervisor usually allocates a segment of memory specific to each VM. For instance, suppose the available memory size of the whole hardware platform is 4 GB, then the hypervisor can allocate 0-1 GB for the first VM, 1 GB-2 GB for the second VM, and the rest 2 GB for other use. Here, the guest operating system of each VM can recognize and operate its own allocated memory, but cannot obtain the memory allocation information outside the VM.

As general conventional computers, various applications are installed on the guest operating system of each VM. These applications on the top layer use the virtual address in operation, i.e. the virtual page number and page offset. Therefore, when executing these applications, the guest operating system allocates a segment of the physical address in its operable memory segment to correspond to the above virtual address. It is understood that the physical address is just the relative physical address in the memory visible to the VM, which is also called the guest physical address.

To manage these addresses, the guest operating system contains a memory management unit that maintains a page table configured to store the mapping relationship between a virtual address and a guest physical address. Since the guest physical address is not the actual physical address of the memory in the hardware platform, the guest operating system cannot access the corresponding memory directly according to the guest physical address. Therefore, another memory management unit is provided in the hypervisor where an extended page table is maintained. The extended page table is configured to store the mapping relationship between a guest physical address and an actual physical address of the memory, which is also called the host physical address. In the above instance, if the second VM allocates a guest physical address with size 0.1-0.2 GB for a virtual address in its operable memory space, then because the operable memory of the second VM is in segment 1 GB-2 GB of the host memory, the host physical address of this guest physical address is allocated the size 1.1 GB-1.2 GB.

Figure 6:
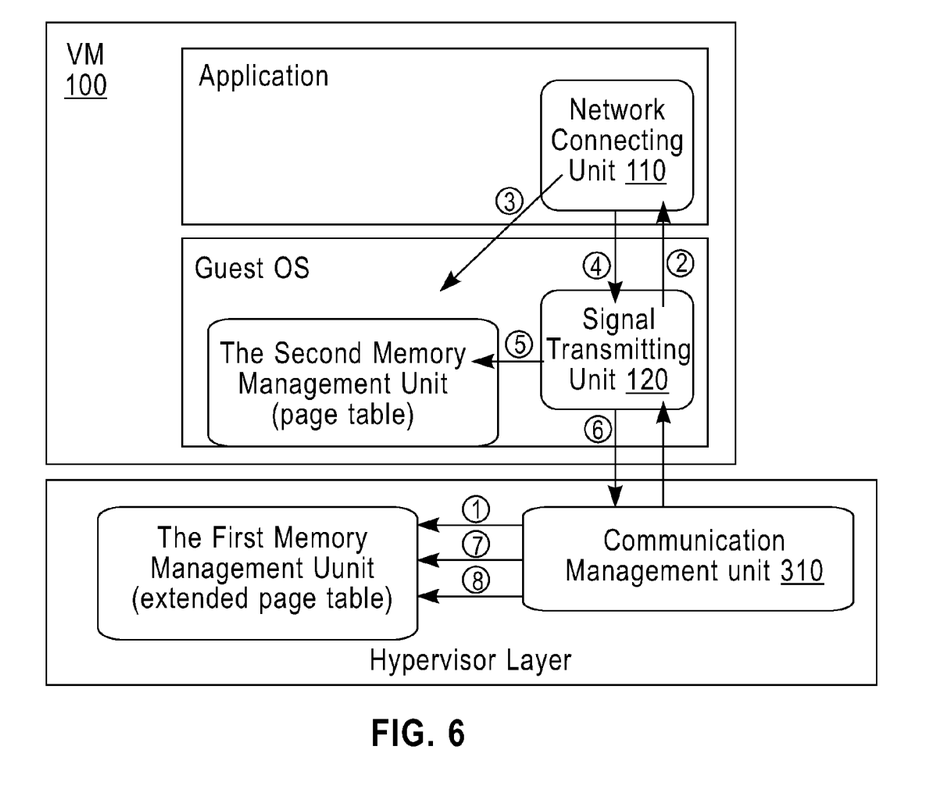
FIG. 6 illustrates the steps of mapping the memory space requested by a VM to the shared memory according to one embodiment of the present invention.

Based on the above management manner, the process of the shared memory mapping will be described in connection with FIG. 6. FIG. 6 illustrates the steps of mapping the memory space address of VM 100 to the address of the shared memory. As shown in FIG. 6, at step 1, the communication management unit 310 allocates a new segment of the memory space as the shared memory from the memory management unit in the hypervisor (the first memory management unit). In the embodiment of the present invention, the memory space that is allocated as the shared memory is free memory segment not used by any VM. Suppose the host physical address of the allocated shared memory is Add0.

At step 2, the communication management unit 310 sends the notification of "the shared memory is ready" to the network connecting unit 110 via the signal transmitting unit 120, and informs it the size, i.e. the page number, of the allocated shared memory.

Then at step 3, in response to the notification, the network connecting unit 110 requests a memory segment with the same size for communication from the memory management unit in the guest operating system (the second memory management unit). Suppose the virtual address of the requested memory segment is Add1.

At step 4, the network connecting unit 110 informs the signal transmitting unit 120 of the virtual address Add1.

At step 5, the signal transmitting unit 120 obtains the guest physical address Add2 corresponding to the virtual address Add1 by looking up the page table maintained in the second memory management unit.

Then at step 6, the signal transmitting unit 120 transfers the obtained guest physical address Add2 to the communication management unit 310.

At step 7, the communication management unit 310 obtains the host physical address Add3 corresponding to the guest physical address Add2 by looking up the extended page table maintained in the first memory management unit.

Finally at step 8, the communication management unit 310 notifies the first memory management unit to modify the extended page table, replacing the host physical address Add3 of the requested memory space with the host physical address Add0 of the shared memory, i.e., making the guest physical address Add2 correspond to the physical address Add0 of the shared memory in the extended page table. Then the communication management unit 310 returns the address of the requested memory space to VM 100.

In the embodiment of the present invention, the communication management unit 310 returns the guest physical address Add2 of the requested memory space to the VM. In this case, the network connecting unit 110 still accesses data according to the obtained address Add2. However, through address translation within the extended page table, it accesses data in the host physical address Add0, i.e., accessing data in the shared memory. FIG. 6 illustrates the steps of mapping the address of the memory space requested by VM 100 to the shared memory address by the communication management unit 310. For the second VM, the above steps 2-8 can be executed repeatedly, enabling the network connecting unit 210 in the second VM to access data in the shared memory in the same way.

The communication management unit 310 detects that there has been a mapping from the VM space to the shared memory by modifying the extended page table. However, the operating system and the above applications of the VM do not recognize such a process. During data transferring, the application in the VM uses a virtual address to write data into the corresponding physical address as usual. It does not detect that the data is not actually written into the special memory allocated for the VM, but into the shared memory space outside the special memory.

The communication process between the VMs in the same physical machine is described above in connection with the connection-oriented communication between the first VM and the second VM as an example. In another example, a connectionless communication can also be adopted between the first VM and the second VM, by using, for example, a UDP protocol. In such a communication manner, the first application in the first VM sends packets directly to the second application in the second VM, without notifying and responding steps. For such communication, the communication management unit 310 can provide a segment of memory dedicated to the shared memory for all connectionless communication. More specifically, the communication management unit 310 can directly allocate the shared memory without responding to the connection request from the VMs. Moreover, the communication management unit 310 notifies the network connecting units of all VMs using connectionless communication that the shared memory is ready and can support the communication at any time. On this basis, when the first application needs to communicate with the second application in a connectionless manner, it still calls the network connecting unit 110 as usual. Then, using a connection-oriented communication, the network connecting unit 110 communicates with the communication management unit 310 via the signal transmitting unit 120, requesting a memory address from it. After obtaining the address of the requested memory that has been mapped to the shared memory, the network connecting unit 110 copies data into the shared memory, thereby recognizing a data transfer and communication with the second VM.

In a connectionless communication, the communication management unit 310 also supports multicast and broadcast communication, i.e., one VM transfers data to a plurality of VMs at the same time. In this case, the communication management unit 310 provides a dedicated shared memory and maps the address for each VM involved in the communication. On this basis, the VM acting as the communication source copies data into the shared memory and other VMs, all read data from this shared memory. Specifically, different from the communication between two VMs, in order to detect the communication of a one-side writing and multi-side reading, a multiple counter can be set for each memory cell of the shared memory, whose status can spread from 0 to n, where n is the VM number on the receiving side. Similarly, each reading operation by the VM on a memory cell would trigger the counter status value to decrease by 1. Accordingly, the data written by the initiating VM can be read once by each receiving VM. It is understood that there are various existing techniques methods for flagging the data status in multicast and broadcast communication. Those skilled in this art can adopt a proper method for the multicast and broadcast communication between VMs.

From the communication process described above in connection with specific examples, the plurality of VMs in communication can access data directly in the memory of the same physical machine. Therefore, the communication speed can be improved in order of magnitude, compared to the traditional communication manner via a physical NIC. Furthermore, the implementation of the network connecting unit requires no change or modification to the existing operating system and the applications of the VMs. Because the memory space requested by the applications in a VM is mapped to the shared memory, the above communication process is transparent for the operating system and the applications of the VM—i.e., data is written into the shared memory. Thus, the method according to an embodiment of the present invention provides a transparent and efficient communication way for VMs in the same physical machine.

Figure 7:
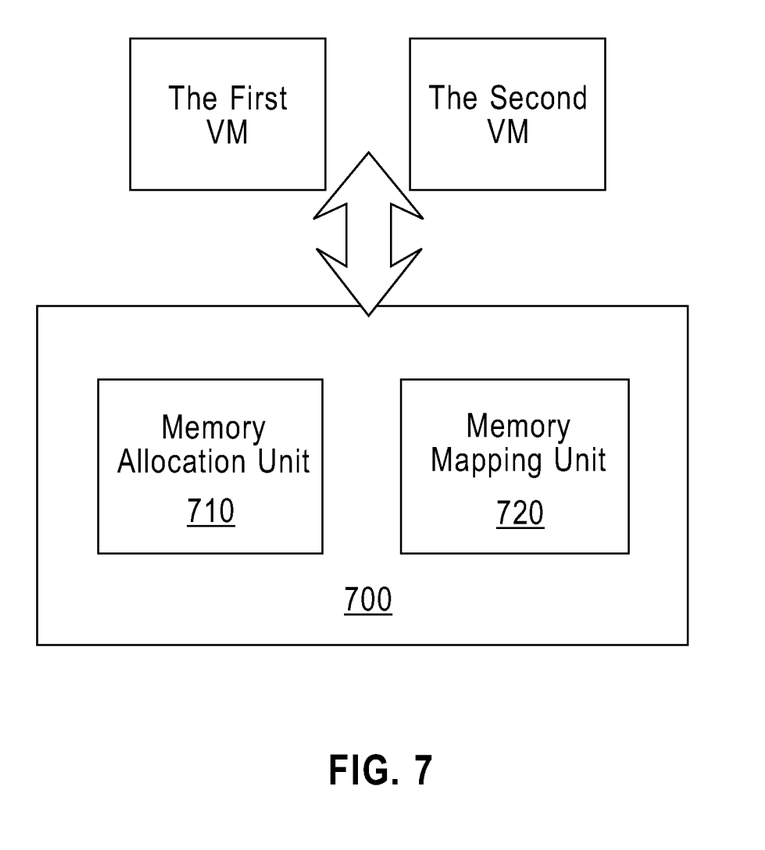
FIG. 7 is a block diagram of the communication management apparatus according to one embodiment of the present invention.

According to another embodiment of the present invention, a communication management apparatus for implementing the above method is provided. FIG. 7 is a block diagram of the communication management apparatus. In FIG. 7, the communication management apparatus is labeled using 700 as a whole, configured to facilitate the communication between a first VM and a second VM, where the first VM and the second VM are in the same physical machine. As shown in the figure, the communication management apparatus 700 includes: a memory allocation unit 710 configured to allocate a shared memory segment from the physical machine's memory and notify the first VM and the second VM; and a memory mapping unit 720 configured to, in response to the memory space request from the first VM and the second VM, map the addresses of the memory space requested by the first VM and the second VM to the addresses of the shared memory respectively, and return the addresses of the requested memory space to the first VM and the second VM.

In the embodiment of the present invention, the communication management apparatus 700 further includes a judgment unit (not shown), configured to determine whether the first VM and the second VM are in the same physical machine. If not, the communication continues in the traditional way. In another example of the embodiment according to the present invention, the memory allocation unit 710 in the communication management apparatus 700 is further configured to free the shared memory when the communication between the first VM and the second VM ends.

Corresponding to the communication management apparatus 700, a VM is also provided in the embodiment according to the present invention. The architecture of this VM can be configured as the first VM 100 or the second VM 200 shown in FIG. 3. A network connecting unit in the VM is provided and it is configured to execute the following steps: request a memory space in response to the notification that the shared memory has been allocated; obtain the address of the requested memory space that has been mapped to the address of the allocated shared memory; and access communication data in the shared memory according to the obtained address of the memory space. A signal transmitting unit is also included in the VM and it is configured to communicate directly between the network connecting unit and the communication management apparatus 700.

Through the above description of the embodiments, those skilled in the art will recognize that the method and apparatus for facilitating communication can be carried out by executable instructions and/or controlling codes in the processors e.g. codes in mediums like disc, CD or DVD-ROM; memories like ROM or EPROM; and carriers like optical or electronic signal carrier. The management apparatus and its units can be detected using hardware like VLSI or Gates and Arrays, like semiconductors e.g. Logic Chip, transistors, etc., or like programmable hardware equipments e.g. FPGA, programmable logic equipments, etc.; or using software executed by different kinds of processors; or using the integration of the hardware and software.

The above-described exemplary embodiments are intended to be illustrative and not restrictive of the method and apparatus for facilitating communication between VMs of the present invention. Those skilled in the art should recognize that the present invention is capable of many variations and modifications within the scope and spirit of the present invention. The scope of the present invention is defined only by the appended claims.

What is claimed is:

1. A computer-implemented method of facilitating the communication between a first Virtual Machine (VM) and a second VM, wherein said first VM and said second VM are in the same physical machine, said method comprises:
   allocating a shared memory segment within the memory of said physical machine and notifying said first VM and said second VM of said allocation;
   mapping the address of a memory space requested by said first VM to a first address of said shared memory segment, said mapping comprising:
   obtaining a first guest physical address of said memory space requested by said first VM in said first VM;
   translating said first guest physical address to a first host physical address in said physical machine by looking up an extended page table; and
   replacing said first host physical address with said host physical address of said shared memory in said extended page table, and
   mapping the address of a memory space requested by said second VM to a second address of said shared memory segment, said mapping comprising:
   obtaining a second guest physical address of said memory space requested by said second VM in said second VM;
   translating said second guest physical address to a second host physical address in said physical machine by looking up the extended page table; and
   replacing said second host physical address with said host physical address of said shared memory in said extended page table; and
   providing said address of said requested memory space by said first VM to said first VM and said address of said requested memory space by said second VM to said second VM.

2. The method of claim 1, wherein said shared memory segment is free memory space not used by any VM.

3. The method of claim 1, wherein the step of allocating a shared memory segment comprises allocating said shared memory segment in response to setting up a connection between said first VM and said second VM.

4. The method of claim 1, further comprising:
   in response to the notification from the first VM of copying data into said shared memory, notifying the second VM of the address of said data in said shared memory.

5. The method of claim 1, further comprising freeing said shared memory segment in response to a disconnection between said first VM and said second VM.

6. A computer-implemented communication management apparatus for facilitating the communication between a first Virtual Machine (VM) and a second VM, wherein said first VM and said second VM are in the same physical machine, said apparatus comprises:
   a memory allocation unit, configured to allocate a shared memory segment within the memory of said physical machine and notify said first VM and said second VM of said allocation; and
   a memory mapping unit, configured to map the address of a memory space requested by said first VM to a first address of said shared memory segment, map the address of a memory space requested by said second VM to a second address of said shared memory segment, and provide said address of said requested memory space by said first VM to said first VM and said address of said requested memory space by said second VM to said second VM, wherein to map said address requested by said first VM, said memory mapping unit configured to:

obtain a first guest physical address of said memory space requested by said first VM in said first VM; translate said first guest physical address to a first host physical address in said physical machine by looking up an extended page table; replace said first host physical address with a first host physical address of said shared memory segment in said extended page table, and to map said address requested by said second VM, said memory mapping unit configured to:

obtain a second guest physical address of said memory space requested by said second VM in said second VM; translate said second guest physical address to a second host physical address in said physical machine by looking up said extended page table; and replace said second host physical address with a second host physical address of said shared memory segment in said extended page table.

7. The apparatus of claim 6, wherein said memory allocation unit is configured to allocate free memory space not used by any VM as the shared memory.

8. The apparatus of claim 6, wherein said memory allocation unit is configured to allocate said shared memory segment in response to setting up a connection between said first VM and said second VM.

9. The apparatus of claim 6, wherein said memory allocation unit is configured to free said shared memory segment in response to a disconnection between said first VM and said second VM.

* * * * *